United States Patent
Raza et al.

(10) Patent No.: US 10,671,353 B2
(45) Date of Patent: Jun. 2, 2020

(54) PROGRAMMING-BY-EXAMPLE USING DISJUNCTIVE PROGRAMS

(71) Applicant: Microsoft Technology Licensing, LLC, Redmond, WA (US)

(72) Inventors: Mohammad Raza, Redmond, WA (US); Sumit Gulwani, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 15/885,319

(22) Filed: Jan. 31, 2018

(65) Prior Publication Data

US 2019/0235842 A1    Aug. 1, 2019

(51) Int. Cl.
*G06F 8/30*    (2018.01)
*G06F 8/10*    (2018.01)
*G06F 8/36*    (2018.01)

(52) U.S. Cl.
CPC .................. *G06F 8/30* (2013.01); *G06F 8/10* (2013.01); *G06F 8/36* (2013.01)

(58) Field of Classification Search
CPC ........ G06F 19/24; G06F 17/21; G06F 17/211; G06F 17/30684; G06F 17/5081
See application file for complete search history.

(56) References Cited

U.S. PATENT DOCUMENTS

| | | |
|---|---|---|
| 5,790,760 A | 8/1998 | Arima |
| 5,920,717 A | 7/1999 | Noda |
| 6,035,302 A | 3/2000 | Tonouchi |
| 6,327,699 B1 | 12/2001 | Larus et al. |
| 6,484,310 B1 | 11/2002 | Przybylski et al. |
| 6,882,999 B2 | 4/2005 | Cohen et al. |
| 6,963,871 B1 | 11/2005 | Hermansen et al. |
| 7,010,779 B2 | 3/2006 | Rubin et al. |
| 7,155,683 B1 | 12/2006 | Williams |

(Continued)

FOREIGN PATENT DOCUMENTS

| | | |
|---|---|---|
| CN | 1400547 A | 3/2003 |
| CN | 101639861 A | 2/2010 |

(Continued)

OTHER PUBLICATIONS

Phillip D. Summers; A Methodology for LISP Program Construction from Examples; Journal of the Association for Computing Machinery, pp. 161-175; retrieved on Dec. 19, 2019 (Year: 1977).*

(Continued)

*Primary Examiner* — S. Sough
*Assistant Examiner* — Cuong V Luu
(74) *Attorney, Agent, or Firm* — Schwegman Lundberg & Woessner, P.A.

(57) ABSTRACT

Systems, methods, and computer-executable instructions for synthesizing a program for a task. A domain specific language that includes a disjunctive symbol and an input/output example for the task are received. A program for the task is synthesized based on the input/output example and the domain specific language. Sub-programs for an instance of the disjunctive symbol are synthesized, A set of feature calculators and target feature values are determined. The program for the task is returned. The program includes the sub-programs, the set of feature calculators and the target feature values.

10 Claims, 3 Drawing Sheets

(56) References Cited

U.S. PATENT DOCUMENTS

| | | |
|---|---|---|
| 7,165,019 B1 | 1/2007 | Lee et al. |
| 7,433,885 B2 | 10/2008 | Jones |
| 7,676,444 B1 | 3/2010 | Venkatachary et al. |
| 7,890,533 B2 | 2/2011 | Pollara |
| 7,979,268 B2 | 7/2011 | Lee |
| 8,175,875 B1 | 5/2012 | Dean et al. |
| 8,180,753 B1 | 5/2012 | Wang |
| 8,589,366 B1 | 11/2013 | Younes et al. |
| 8,650,207 B2 | 2/2014 | Gulwani et al. |
| 8,799,234 B2 | 8/2014 | Gulwani et al. |
| 8,972,930 B2 | 3/2015 | Gulwani |
| 9,542,622 B2 | 1/2017 | Gulwani et al. |
| 9,552,335 B2 | 1/2017 | Gulwani et al. |
| 9,613,115 B2 | 4/2017 | Gulwani et al. |
| 2002/0069220 A1 | 6/2002 | Tran |
| 2003/0004874 A1 | 1/2003 | Ludwig et al. |
| 2003/0055849 A1 | 3/2003 | Thure et al. |
| 2004/0158810 A1 | 8/2004 | Dove et al. |
| 2005/0055365 A1 | 3/2005 | Ramakrishnan et al. |
| 2005/0080755 A1 | 4/2005 | Aoyama |
| 2005/0149536 A1 | 7/2005 | Wildes et al. |
| 2005/0182629 A1 | 8/2005 | Coorman et al. |
| 2005/0228640 A1 | 10/2005 | Aue et al. |
| 2005/0246681 A1 | 11/2005 | Little et al. |
| 2006/0242180 A1 | 10/2006 | Graf et al. |
| 2007/0055493 A1 | 3/2007 | Lee |
| 2007/0220481 A1 | 9/2007 | Gabel et al. |
| 2008/0282108 A1 | 11/2008 | Jojic et al. |
| 2009/0049354 A1 | 2/2009 | Buckley, Jr. |
| 2009/0077542 A1 | 3/2009 | Chou et al. |
| 2009/0106710 A1 | 4/2009 | Teig et al. |
| 2009/0119416 A1 | 5/2009 | Sirdevan et al. |
| 2009/0119584 A1 | 5/2009 | Herbst |
| 2009/0132477 A1 | 5/2009 | Zuev et al. |
| 2009/0210418 A1 | 8/2009 | Arasu et al. |
| 2009/0226081 A1 | 9/2009 | Zhou et al. |
| 2009/0288065 A1 | 11/2009 | Nathan et al. |
| 2009/0300326 A1 | 12/2009 | Sweeney |
| 2010/0083092 A1 | 4/2010 | Schuller et al. |
| 2010/0125828 A1 | 5/2010 | Vasista |
| 2010/0146254 A1 | 6/2010 | Park et al. |
| 2010/0312549 A1 | 12/2010 | Akuwudike |
| 2011/0038351 A1 | 2/2011 | Sahara |
| 2011/0038531 A1 | 2/2011 | Arasu et al. |
| 2011/0302553 A1* | 12/2011 | Gulwani ............... G06F 9/44 717/107 |
| 2012/0011084 A1 | 1/2012 | Gulwani et al. |
| 2012/0011152 A1* | 1/2012 | Gulwani ............ G06F 16/258 707/771 |
| 2012/0089620 A1 | 4/2012 | Castellanos et al. |
| 2012/0317472 A1 | 12/2012 | Chernysh |
| 2013/0232157 A1 | 9/2013 | Kamel |
| 2013/0326475 A1 | 12/2013 | Gulwani et al. |
| 2013/0346982 A1 | 12/2013 | Kalai et al. |
| 2014/0201126 A1 | 7/2014 | Zadeh et al. |
| 2015/0254530 A1* | 9/2015 | Gulwani ............... G06F 16/84 382/187 |
| 2017/0091589 A1 | 3/2017 | Gulwani et al. |
| 2019/0042210 A1 | 2/2019 | Gaunt et al. |
| 2019/0171422 A1 | 6/2019 | Udupa et al. |

FOREIGN PATENT DOCUMENTS

| | | | |
|---|---|---|---|
| KR | 20000022724 A | 4/2000 | |
| KR | 20060045349 A | 5/2006 | |
| WO | 2010088523 A1 | 8/2010 | |

OTHER PUBLICATIONS

Philip J. Guo et al.; CDE Using System Call Interposition to Automatically Create Portable Software Packages; usenix; 6 pages; retrieved on Dec. 19, 2019 (Year: 2011).*

Lieberman, Henry, "Your Wish is My Command: Programming by Example", In Publications of Morgan Kaufmann, Mar. 12, 2001, 1-416.

Alur, et al., "Scaling enumerative program synthesis via divide and conquer", In Proceedings of 23rd International Conference Tools and Algorithms for the Construction and Analysis of Systems, Apr. 22, 2017, pp. 1-17.

Balog, et al., "Deepcoder: Learning to write programs", In Proceedings of International Conference on Learning Representations, Apr. 24, 2017, pp. 1-19.

Devlin, et al., "RobustFill: Neural Program Learning under Noisy I/O", In Proceedings of the 34 th International Conference on Machine Learning, Aug. 6, 2017, 18 Pages.

Ellis, et al., "Learning to learn programs from examples: Going beyond program structure", In Proceedings of International Joint Conferences on Artifical Intelligence, Aug. 19, 2017, 37 Pages.

Gulwani, Sumit, "Automating string processing in spreadsheets using input-output examples", In Proceedings of the 38th annual ACM SIGPLAN-SIGACT symposium on Principles of programming languages, Jan. 26, 2011, pp. 317-329.

Gulwani, et al., "Spreadsheetdata manipulation using examples", In Publications of Communications of the ACM, vol. 55, Issue 8, Aug. 2012, pp. 97-105.

Kini, et al. "FlashNormalize: programming by examples for text normalization", In Proceedings of the 24th International Conference on Artificial Intelligence, Jul. 25, 2015, 8 Pages.

Lau, et al., "Programming by Demonstration Using Version Space Algebra", In Journal Machine Learning, vol. 53 Issue 1-2, Oct. 2003, pp. 1-59.

Le, et al., "FlashExtract: a framework for data extraction by examples", In Proceedings of the 35th ACM SIGPLAN Conference on Programming Language Design and Implementation, Jun. 9, 2014, pp. 542-553.

Manshadi, et al., "Integrating programming by example and natural language programming.", In Proceedings of the Twenty-Seventh AAAI Conference on Artificial Intelligence., Jul. 14, 2013, 7 Pages.

Menon, et al., "A machine learning framework for programming by example", In Proceedings of the 30th International Conference on International Conference on Machine Learning, vol. 28, Jun. 16, 2013, 9 Pages.

Polozov, et al., "FlashMeta: a framework for inductive program synthesis", In Proceedings of International Conference on Object-Oriented Programming, Systems, Languages, and Applications, Oct. 25, 2015, pp. 107-126.

Raza, et al., "Automated data extraction using predictive program synthesis", In Proceedings of Association for the Advancement of Artificial Intelligence, Feb. 5, 2017, 9 Pages.

Singh, et al., "BlinkFill: Semi-supervised Programming by Example for Syntactic String Transformations", In Proceedings of Proceedings of the VLDB Endowment, vol. 9, Issue 10, Jun. 2016, pp. 816-827.

Singh, et al., "Predicting a correct program in programming by example", In Proceedings of International Conference on Computer Aided Verification, Jul. 18, 2015, pp. 1-17.

"Data Wrangler", Retrieved from: http://vis.stanford.edu/wrangler/, Retrieved on: Feb. 26, 2014, 01 Page.

"Google Refine", Retrieved from: http://code.google.com/p/google-refine/, Retrieved on: Feb. 26, 2014, 2 Pages.

"OpenRefine", Retrieved from: http://openrefine.org, Retrieved on: Feb. 26, 2014, 5 Pages.

"PADS Project, Online Documentation Page", Retrieved from: http://www.padsproj.org/doc.html, Retrieved Date: Jul. 5, 2010, 03 Pages.

"Planning, Installation, and Problem Determination Guide", Genesys Telecommunications Laboratories, Inc., Daly City, CA, Retrieved Date: Feb. 24, 2010, 14 pages.

"Program Synthesis", Retrieved from: https://web.archive.org/web/20120911133105/http://research.microsoft.com/en-us/um/people/sumitg/pubs/synthesis.html, Retrieved Date: Jul. 1, 2012, 04 Pages.

"Splunk", Retrieved from http://www.splunk.com/, Retrieved on: Feb. 26, 2014, 2 Pages.

"Sumit Gulwani homepage and publication listing", Retrieved from: https://web.archive.org/web/20100329060129/http://research.microsoft.com/en-us/um/people/sumitg/, Mar. 29, 2010, 03 Pages.

(56) References Cited

OTHER PUBLICATIONS

"European Search Report Issued in European Patent Application No. 11790189.2", dated Oct. 21, 2013, 2 Pages.
"Office Action Issued for European Patent Application No. 11790189. 2", dated Feb. 9, 2015, 3 Pages.
"Office Action Issued in European Patent Application No. 11790189. 2", dated Nov. 4, 2013, 6 Pages.
"Office Action Issued in European Patent Application No. 11790189. 2", dated Dec. 3, 2014, 3 Pages.
"Final Office Action Issued in U.S. Appl. No. 12/793,700", dated Aug. 22, 2013, 23 Pages.
"Non Final Office Action Issued in U.S. Appl. No. 12/793,700", dated Jan. 6, 2014, 24 Pages.
"Non Final Office Action Issued in U.S. Appl. No. 12/793,700", dated Mar. 14, 2013, 23 Pages.
"Notice of Allowance Issued in U.S. Appl. No. 12/793,700", dated Jul. 11, 2014, 14 Pages.
"Final Office Action Issued in U.S. Appl. No. 12/834,031", dated Jun. 5, 2014, 24 Pages.
"Final Office Action Issued in U.S. Appl. No. 12/834,031", dated Oct. 15, 2012, 16 Pages.
"Non Final Office Action Issued in U.S. Appl. No. 12/834,031", dated May 10, 2012, 16 Pages.
"Non Final Office Action Issued in U.S. Appl. No. 12/834,031", dated Jan. 3, 2014, 21 Pages.
"Non Final Office Action Issued in U.S. Appl. No. 13/020,153", dated Nov. 14, 2013, 10 Pages.
"Non Final Office Action Issued in U.S. Appl. No. 14/636,664", dated Mar. 16, 2016, 14 Pages.
"Final Office Action Issued in U.S. Appl. No. 15/376,638", dated Dec. 11, 2017, 12 Pages.
"Non-Final Office Action Issued in U.S. Appl. No. 15/376,638", dated Jul. 18, 2017, 13 Pages.
"Non Final Office Action Issued in U.S. Appl. No. 15/829,591", dated May 31, 2019, 25 Pages.
"First Office Action and Search Report Issued in Chinese Patent Application No. 201180027421.8", dated Jan. 27, 2015, 17 Pages.
"Office Action Issued in Chinese Patent Application No. 201210023688. 6", dated Sep. 12, 2014, 7 Pages.
Abraham, et al., "Header and Unit Inference for Spreadsheets Through Spatial Analyses", In Proceedings of IEEE Symposium on Visual Languages and Human Centric Computing, Sep. 26, 2004, pp. 1-8.
Adelberg, Brad, "NoDoSE—A tool for Semi-Automatically Extracting Structured and Semistructured Data fromText Documents", In Proceedings of the ACM SIGMOD international conference on Management of data, Jun. 2, 1998, 25 Pages.
Alvarez, et al., "FINDER: A Mediator System for Structured and Semi-Structured Data Integration", In Proceedings of 13th International Workshop on Database and Expert Systems Applications, Sep. 2, 2002, 5 Pages.
Alves, et al., "LattesMiner: a Multilingual DSL for Information Extraction from Lattes Platform", In Proceedings of the compilation of the co-located workshops, Oct. 23, 2011, pp. 85-91.
Angulin, Dana, "Learning Regular Sets from Queries and Counterexamples", In Journal of Information and Computation, vol. 75, Issue 2, Nov. 1, 1987, pp. 87-106.
Anton, Tobias, "Xpath-Wrapper Induction by Generalizing Tree Traversal Patterns", In Proceedings of Lernen, Wissensentdeckung und Adaptivitat, Oct. 10, 2005, 8 Pages.
Arasu, et al., "Extracting Structured Data from Web Pages", In Proceedings of the ACM SIGMOD International Conference on Management of Data, Jun. 9, 2003, pp. 337-348.
Arasu, et al., "Learning String Transformations from Examples", In Proceedings of the VLDB Endowment, vol., Issue 1, Aug. 1, 2009, pp. 514-525.
Bonnet, et al., "Extraction and Integration of Data from Semistructured Documents into Business Applications", In International Conference on Industrial Applications of Prolog (I NAP), Sep. 1997, 9 Pages.

Chang, et al., "IEPAD: Information Extraction Based on Pattern Discovery", In Proceedings of the 10th International Conference on World Wide Web, May 1, 2001, pp. 681-688.
Chattratichat, et al., "A Visual Language for Internet-Based Data Mining and Data Visualization", In Proceedings of the IEEE Symposium on D Visual Languages, Sep. 1999, 8 Pages.
Chaudhuri, et al., "Smooth Interpretation", In Proceedings of the ACM SIGPLAN conference on Programming language design and Implementation, vol. 45, Issue 06, Jun. 12, 2010, 14 Pages.
Crescenzi, et al., "RoadRunner: Towards Automatic Data Extraction from Large Web Sites", In Proceedings of the 27th International Conference on Very Large Data Bases, Sep. 11, 2001, 10 Pages.
Cunha, et al., "From Spreadsheets to Relational Databases and Back", In Proceedings of the ACM SIGPLAN Workshop on Partial Evaluation and Program Manipulation, Jan. 19, 2009, 21 Pages.
Cypher, Allen, "EAGER: Programming Repetitive Tasks by Example", In Proceedings of the SIGCHI conference on Human factors in comQuting systems, Apr. 28, 1991, 8 Pages.
De Moura, et al., "Z3: An Efficient SMT Solver", In Journal of Tools and Algorithms for the Construction and Analysis of Systems, vol. 4963, Apr. 3, 2008, pp. 337-340.
Elhadi, et al., "Use of Text Syntactical Structures in Detection of Document Duplicates", In Proceedings of Third International Conference on Digital Information Management, Nov. 13, 2008, pp. 520-525.
Embley, et al., "Table-Processing Paradigms: A Research Survey", In International Journal of Document Analysis and Recognition, vol. 8, No. 2-3, May 9, 2006, pp. 66-86.
Fisher, et al., "From Dirt to Shovels: Fully Automatic Tool Generation from Ad Hoc Data", in Proceedings of the 35th Annual ACM SIGPLAN-SIGACT Symposium on Principles of Programming Languages, vol. 43, Issue 1, Jan. 7, 2008, pp. 421-434.
Fisher, et al., "LearnPADS: Automatic Tool Generation from Ad Hoc Data", In Proceedings of the ACM SIGMOD International Conference on Management of Data, Jun. 9, 2008, pp. 1299-1302.
Fisher, et al., "PADS: A Domain-Specific Language for Processing Ad Hoc Data", In Proceedings of the ACM SIGPLAN Conference on Programming Language Design and Implementation, Jun. 12, 2005, pp. 295-304.
Fisher, et al., "The EUSES Spreadsheet Corpus: A Shared Resource for Supporting Experimentation with Spreadsheet Dependability Mechanisms", In Proceedings of the First Workshop on End-User Software Engineering., May 21, 2005, 5 Pages.
Fisher, et al., "The Next 700 Data Description Languages", In Proceedings of Conference Record of the 33rd ACM SIGPLAN-SIGACT Symposium on Principles of Programming Languages, Jan. 11, 2006, 14 Pages.
Fisher, et al., "The PADS Project: An Overview", In Proceedings of the 14th International Conference on Database Theory, Mar. 21, 2011, 7 Pages.
Frenz, Christopher M., "Pro Perl Parsing", In Proceedings of Apress, Aug. 22, 2005, 273 Pages.
Gong, et al., "Automating Microsoft Office Word in Visual Basic", Second International SymQosium on Electronic Commerce and Security, May 22, 2009, pp. 93-97.
Gualtieri, et al., "Deputize End-user Developers to Deliver Business Agility and Reduce Costs", Retrieved from: https://www.forrester.com/report/Deputize+EndUser+Developers+To+Deliver+Business+Agility+And+Reduce+Costs/-/E-RES54191, Apr. 15, 2009, 2 Pages.
Gulwani, et al., "A Polynomial-Time Algorithm for Global Value Numbering", In Proceedings of International Static Analysis Symposium, Aug. 26, 2004, 17 Pages.
Gulwani, "Dimensions in Program Synthesi", In Proceedings of the 12th International ACM SIGPLAN Symposium on Principles and Practice of Declarative Programming, Jul. 26, 2010, pp. 13-24.
Gulwani, et al., "Spreadsheet Data Manipulation Using Examples", In Magazine Communications of the ACM, vol. 55, Issue 8, Aug. 1, 2012, pp. 97-105.
Gulwani, Sumit, "Synthesis from Examples: Interaction Models and Algorithms", In Proceedings of the 14th International Symposium on Symbolic and Numeric Algorithms for Scientific Computing, Sep. 26, 2012, 7 Pages.

(56) References Cited

OTHER PUBLICATIONS

Harris, et al., "Spreadsheet Table Transformations from Examples", In Proceedings of the 32nd ACM SIGPLAN Conference on Programming Language Design and Implementation, vol. 46, Issue 6, Jun. 4, 2011, 12 Pages.
Hsu, et al., "Generating Finite-State Transducers for Semi-Structured Data Extraction from the Web", In Journal of Information Systems—Special Issue on Semistructured Data, vol. 23, Issue 8, Dec. 1998, pp. 521-538.
Jha, et al., "Oracle-Guided Component-Based Program Synthesis", In Proceedings of the 32nd ACM/IEEE International Conference on Software Engineering, vol. 1, May 1, 2010, pp. 215-224.
Kandel, et al., "Wrangler: Interactive Visual Specification of Data Transformation Scripts", In Proceedings of the SIGCHI Conference on Human Factors in Computing Systems, May 7, 2011, pp. 3363-3372.
Ko, et al., "Six Learning Barriers in End-User Programming Systems", In Proceedings of the IEEE Symposium on Visual Languages, Human Centric Computing, Sep. 30, 2004, 8 Pages.
Kuncak, et al., "Complete Functional Synthesis", Proceedings of the 2010 ACM SIGPLAN conference on Programming language design and imQiementation, vol. 46. Issue 06, Jun. 5, 2010, 14 Pages.
Kushmerick, Nicholas, "Wrapper Induction for Information Extraction", In Proceedings of the Fifteenth International Joint Conference on Artificial Intelligence, Aug. 23, 1997, 264 Pages.
Lau, et al., "Learning Programs from Traces using Version Space Algebra", In Proceedings of the 2nd International Conference on Knowledge Capture (K-CAP'03), Oct. 23, 2003, 8 Pages.
Lau, et al., "Learning Repetitive Text-editing Procedures with SMARTedit", Retrieved from: http://www.cs.washington.edu/homes/pedrod/papers/ywimc.html, Retrieved Date: Mar. 21, 2011, 14 Pages.
Lau, et al., "Programming Shell Scripts by Demonstration", In Proceedings of Workshop on Supervisory Control of Learning and Adaptive Systems. American Association for Artificial Intelligence, Jul. 25, 2004, 5 Pages.
Lau, et al., "Version Space Algebra and its Application to Programming by Demonstration", In Proceedings of the Seventeenth International Conference on Machine Learning, Jun. 29, 2000, 8 Pages.
Lau, Tessa, "Why PBD Systems Fail: Lessons Learned for Usable AI", In Proceedings of CHI Workshop on Usable Artificial Intelligence, Apr. 2008, 4 Pages.
Matskin, et al., "Value-Added Web Services Composition Using Automatic Program Synthesis", In International Workshop on Web Services, May 27, 2002, pp. 213-224.
McFedries, Paul, "Tricks of the Microsoft Office Gurus", Que Corp., 2nd Edition, 2007, Amazon.com abstract only, Retrieved Date: Jun. 3, 2010, 7 Pages.
Miller, et al., "Interactive Simultaneous Editing of Multiple Text Regions", In Proceedings of the General USENIX Annual Technical Conference on General Track., Jun. 25, 2001, 15 Pages.
Miller, Robert C.., "Lightweight Structure in Text", In PhD Dissertation of Carnegie Mellon University, May 2002, 341 Pages.
Mitchell, Tom M., "Generalization as Search", In Journal of Artificial Intelligence, vol. 18, Issue 2, Mar. 1, 1982, pp. 203-226.
Muslea, et al., "A Hierarchical Approach to Wrapper Induction", In Proceedings of the Third Annual Conference on Autonomous Agents,, Apr. 1, 1999, pp. 190-197.
Myers, et al., "Invited Research Overview: End-User Programming", In Proceedings of CHI '06 Extended Abstracts on Human Factors in Computing Systems, Apr. 21, 2006, pp. 75-80.
Nix, Robert P., "Editing by Example", In ACM Transactions on Programming Languages and Systems (TOPLAS), vol. 1, No. 4, Oct. 1, 1985, pp. 600-621.
Oro, et al., "Sxpath: Extending Xpath Towards Spatial Querying on Web Documents", In Journal of the VLDB Endowment, vol. 4, Issue 2, Sep. 13, 2010, pp. 129-140.

"International Search Report and Written Opinion Issued in PCT Patent Application No. PCT/US2011/037411", dated Feb. 9, 2012, 8 Pages.
"International Search Report and Written Opinion Issued in PCT Application No. PCT/US2015/019131", dated Jul. 2, 2015, 13 Pages.
Richardson, et al., "Approaches to Specification-Based Testing", In Proceedings of Proceedings of the Third ACM SIGSOFT Symposium on Software Testing, Analysis, and Verification {TAV3), Dec. 1, 1989, 11 Pages.
Russell, et al., "Artificial Intelligence: AModern Approach", Retrieved From: https://web.archive.org/web/20120628055500/http://www.amazon.com/Artificial-Intelligence-Modern-Approach-Edition/dp/0136042597, Jun. 28, 2012, 6 Pages.
Sarma, et al., "Synthesizing View Definitions from Data", In Proceedings of the 13th ACM International Conference on Database Theory, Mar. 23, 2010, 15 Pages.
Schrodl, et al., "Inferring Flow of Control in Program Synthesis by Example", Lecture Notes in Computer Science, vol. 1701, Proceedings of the 23rd Annual German Conference on Artificial Intelligence: Advances in Artificial Intelligence, Sep. 1999, 12 Pages.
Singh, et al., "Learning Semantic String Transformations from Examples", In Proceedings of the VLDB Endowment, vol. 5, Issue 8, Apr. 1, 2012, pp. 740-751.
Singh, et al., "Synthesizing Number Transformations from Input-Output Examples", In Proceedings of the 24th International Conference on Computer Aided Verification, Jul. 7, 2012, 72 Pages.
Solar-Lezama, et al., "Sketching Stencils", In Proceedings of the ACM SIGPLAN conference on Programming language Design and Implementation, Jun. 11, 2007, pp. 167-178.
Srivastava, et al., "From Program Verification to Program Synthesis", In Proceedings of the 37th Annual ACM SIGPLAN-SIGACT Symposium on Principles of Programming Languages, Jan. 17, 2010, pp. 313-326.
Tejada, et al., "Learning Domain-Independent String Transformation Weights for High Accuracy Object Identification", Eighth ACM SIGKDD International Conference on Knowledge Discovery and Data Mining, Jul. 23, 2002, 10 Pages.
Vilar, Juan, "Query learning of Subsequential Transducers", In Proceedings of the 3rd International Colloquium on Grammatical Inference: Learning Syntax from Sentences, Lecture Notes in Computer Science, vol. 1147, Sep. 25, 1996, pp. 72-83.
Walkenbach, John, "Excel 2010 Formulas", Wiley Publishing, Inc., Amazon.com product page only, May 24, 2010, 6 Pages.
Witten, et al., "TELS: learning text editing tasks from examples", In Book of Watch what I do: programming by demonstration, MIT Press, Cambridge, MA, Aug. 30, 1993, 17 Pages.
Xi, et al., "A Context-Free Markup Language for Semistructured Text", In Proceedings of the ACM SIGPLAN Conference on Programming Language Design and Implementation, Jun. 5, 2010, pp. 221-232.
Xi, et al., "Ad Hoc Data and the Token Ambiguity Problem", Proceedings of the 11th International Symposium on Practical Aspects of Declarative Languages, Jan. 19, 2009, 15 Pages.
Yessenov, et al., "A Colorful Approach to Text Processing by Example", In Proceedings of the 26th Annual ACM Symposium on User Interface Software and Technology, Oct. 8, 2011, pp. 495-504.
Zhang, et al., "Editable Replay of IDE-based Repetitive Tasks", In Proceedings of 32nd Annual IEEE International Computer Software and Appiications Conference, Jul. 28, 2008, pp. 473-480.
"Office Action Issued in Indian Patent Application No. 10047/CHENP/2012", dated Jul. 18, 2019, 05 Pages.
"Office Action Issued for Korean Patent Application No. 10-2012-7031637", dated Feb. 20, 2017, 05 Pages.
"Final Office Action Issued in U.S. Appl. No. 15/829,591", dated Dec. 11, 2019, 29 Pages.

\* cited by examiner

PROGRAMMING-BY-EXAMPLE USING DISJUNCTIVE PROGRAMS

BACKGROUND

Many computer users and knowledge workers are not computer programmers, and yet commonly face challenges for which programming skills would be useful or needed. Example data manipulation tasks include extracting substrings of text from a column in a spreadsheet and extracting important data fields from a collection of richly formatted emails or web pages. Such tasks may be performed by professional programmers by writing custom extraction scripts using regular expressions, macros or CSS expressions. These solutions, however, require programming skills that a computer user may not have.

A program-by-example (PBE) system may be beneficial in helping end users to automate the generation of such scripts. A PBE system allows the user to specify their intent by providing one or more input-output examples of the desired task. From these input-output examples, a PBE system attempts to automatically generate a program in an underlying domain specific language (DSL) that satisfies the given examples. Instead of opaquely automating one-off tasks, PBE may produce lightweight scripts in common programming languages that may be saved and reused by users in different environments, independently of the learning techniques used to infer those scripts.

PBE approaches have seen significant interest and progress in recent years. One challenge faced by current PBE systems is that the programs inferred from a few examples generally lack robustness and easily fail on new inputs. This is because the state space of possible programs (defined by the DSL) is large, since the DSL needs to support expressive programs covering different tasks, and hence there can be many possible programs satisfying a given set of input-output examples provided by the user. This expressivity vs. correctness trade-off is a challenge in the design of PBE systems, which is why there has been a strong effort in the synthesis community to improve the ranking used in PBE systems to choose the most likely program the user may want out of the large set of candidates that logically satisfy the given examples.

DETAILED DESCRIPTION

Figure 1:
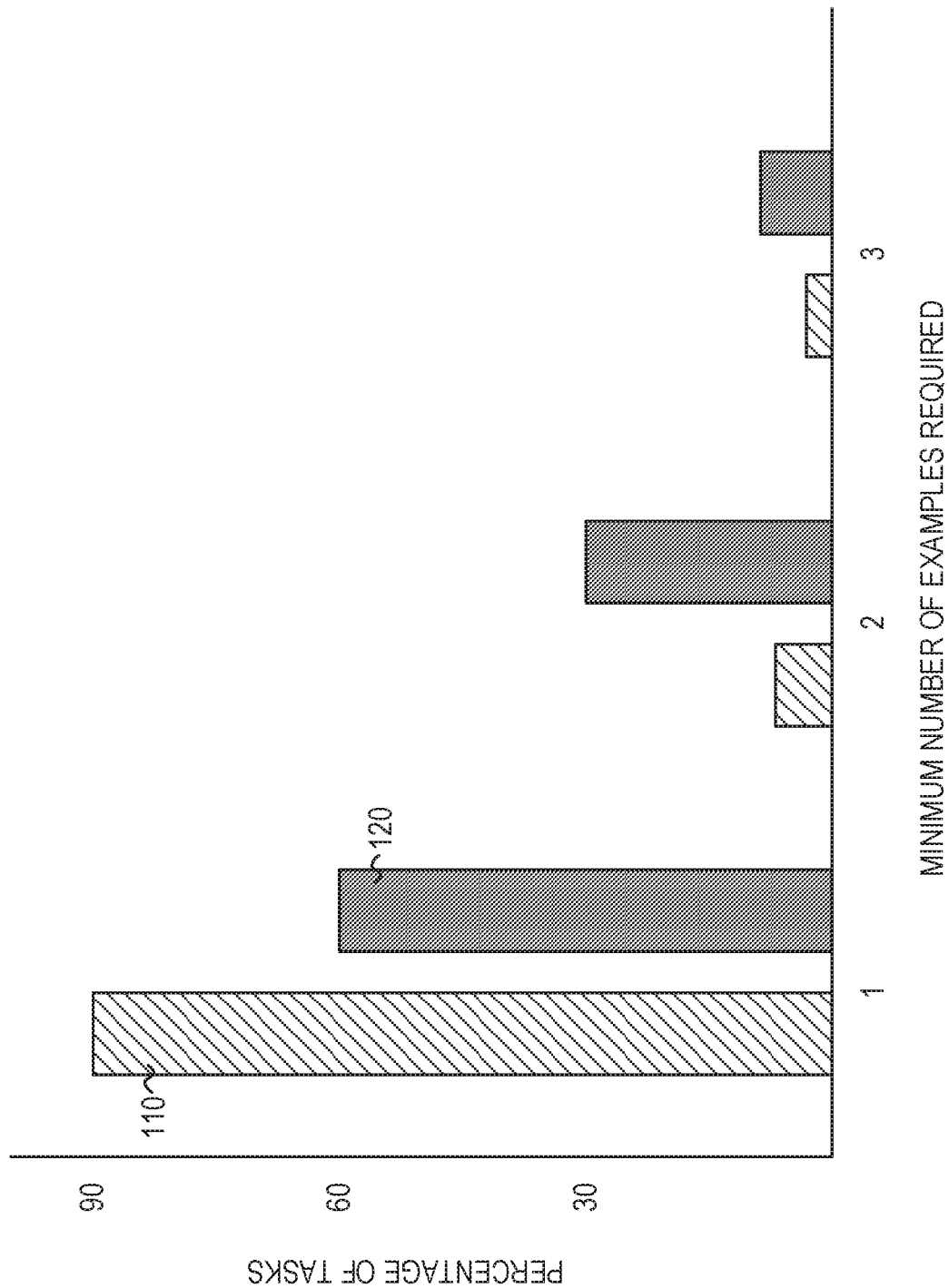
FIG. 1 is a graph showing the number of examples needed for correct synthesis in accordance with respective examples.

In current PBE systems, a ranking system is used during program synthesis to rank the different candidate programs created by the PBE system. The ranking system, therefore, allows a PBE system to select one of the candidate programs as the synthesized program to return to the user. As the ranking system is used during the synthesis of a program, the ranking system may only consider the one or more input-output examples provided by the user. Accordingly, the ranking system cannot use new input provided by after synthesis when the synthesized program is to be executed on some future input.

Further, no matter how good a ranking technique is, ranking during synthesis restricts the PBE system to choose a single option from a set of many likely possibilities. This is true for synthesis at every sub-program level, not just for final programs. Thus, each sub-program level provides an opportunity for a PBE system to choose a sub-program that may not be robust with new input.

In this disclosure, a PBE system is described that increases robustness of a final program and sub-programs by not prematurely committing to a single choice of program at synthesis time. Instead, the ranking decision is delayed to the execution of the program when there is more information available, i.e., new input on which the program is to be executed. The final program produced by the disclosed PBE system synthesizes a disjunctive program that includes many possible top-ranked programs as possible alternatives and selects between these different choices upon execution on the new input. This delayed choice brings the important benefit of comparing the possible outputs produced by the different disjuncts on a given input at execution time. Thus, the new ranking system considers the new input that was not available at synthesis time. A disjunctive program may also use different sub-programs/disjuncts based on different data to produce accurate output. Using the disclosed features, an increase from 59% to 93% of tasks for which correct programs were learned from a single example was achieved.

Table 1 shows an example data cleaning scenario where a user would like to remove the arbitrary description that occurs around the product ID in the input column, as shown in the desired output column. The user may provide the first row as the only input-output example. With this one example a PBE system based on regular expressions such as Flash Fill can generate many possible satisfying programs that employ different substring extraction logics.

TABLE 1

| Input | Desired output |
| --- | --- |
| 12 units PID 24122 Laptop | PID 24122 |
| 43 units PID 98311 Wireless keyboard | PID 98311 |
| 7 units PID 21312 Memory card | PID 21312 |
| 22 units PID 23342 Docking station v2 | PID 23342 |
| 6 units PID 64232 Mouse with pad | PID 64232 |
| . . . | . . . |

For instance, a possible logic, as part of a synthesized program, to detect the end of the extracted substring could include "the end of the last number" (program 1 ($P_1$)), "the end of the second number" ($P_2$), "the end of the first number that occurs after capital letters and whitespace" ($P_3$), along with many other expressions that would properly extract the intended substring. Some current PBE systems favor simplicity, in which case the PBE system would select the program $P_1$. However, this program fails on row four, where there happens to be another number occurring at the end of the input, and so the program P1 would incorrectly output the string "PM 23342 Docking station v2" for row four. The programs $P_2$ or $P_3$, however, would have produced the correct result. The data in row four, however, was not available during program synthesis. Further, a user has no way of knowing which examples to provide to the PBE system to ensure that the PBE system learns better programs.

Improving the ranking system in current PBE systems to choose a better program has limits, because there is no single ranking strategy that will work in all cases. Depending on the variability in the data set, it is possible that there is no single logic that will satisfy all input. Rather, there may be different programs that apply to different rows to solve the overall task more correctly/robustly. For example, on an input row such as "22 units PID 23342 Docking station VERSION 2" the program $P_3$ would fail, or on a row "22 to 25 units PID 23342 Docking station v2" the program $P_2$ would fail. Hence, in such situations any one ranking scheme used to select one program would fail on some inputs.

Thus, the robustness of a synthesized program is negatively impacted by restricting logic/sub-programs to a choice of extraction logic at the synthesis stage. In this disclosure, rather than prematurely enforcing a single choice Pi from the list of top-ranked programs P1, . . . , Pn in the synthesis algorithm, the disclosed PBE system instead synthesizes a more robust disjunctive program that includes all of the choices P1, . . . , Pn and selects between these different logic/sub-programs/disjuncts when the final synthesized program is executed on a new input. Hence, with this disjunctive approach, the PBE system delays the choice of which logic/sub-program/disjuncts to use until the input is received at execution time. The PBE system may then compare the outputs produced by the different logics at one or more different levels on the input to select the logic/sub-program/disjunct.

Another example from the domain of web extraction is provided below. In this example, the user's extraction task is to extract a particular data field from a structured HTML document, such as extracting the flight number from an email containing a flight itinerary. In existing PBE systems for web extraction, the user may perform such a task by giving examples of the desired field on a few mails, from which the system will synthesize node selection expressions based on languages such as XPath or CSS selectors to extract nodes in the HTML DOM (Document Object Model). For example, assume the user example of the desired field refers to the following SPAN element node in the HTML markup: <span style="color: gray" class="c1">BA052</span>

The challenge comes in choosing which properties of the example nodes to include or exclude in the node selection logic, as it is not known which of these properties would be varying in other inputs. For example, in this case possible selection logics include "color is gray" ($P_1$), "class is c1" ($P_2$) or the more restrictive conjunction of the two properties "color is gray and class is c1" ($P_3$). Some ranking schemes choose to be conservative and choose the most specific logics. These logics, however, tend to impose too many constraints and overfit the examples. These logics, therefore, fail to return any result on new inputs. Choosing more general logics has the pitfall of losing important properties and identifying incorrect nodes.

This is another example where using a disjunctive approach to maintain a set of these different possible selection logics in the synthesized program would be beneficial. The logic may then be selected at execution time when the new input is available. For example, the program may first try the most specific logic and if that fails to return any result then less restrictive logics may be tried.

The number of possible logics, however, may be too large to include all the possible logics in the final program. For example, in the above SPAN example the set of possible logics grows exponentially with the number of properties that a node may have, as possible conjunctions of the predicates correspond to all possible subsets. Including all these possibilities in a disjunctive program would not be viable, both in terms of performance of the learning algorithm as well as the size and execution time of the final synthesized program. Accordingly, in some embodiments, a technique is used to compute the maximal (the most specific) as well as a set of minimal (least restrictive) programs that satisfy the example extractions and together cover all the properties of the example nodes. These candidates covering all the observed properties may be chosen as effective disjuncts by the synthesis algorithm to yield efficient and robust disjunctive program.

The above two examples illustrate how PBE systems generate programs that may easily fail on new inputs. However, providing more examples to existing PBE system does not guarantee the PBE system will learn better programs. Even if users are willing to give many examples, the user cannot know which examples to give. Generally, provided examples are representative of their target data and used by the PBE system to learn a program. A program providing incorrect output is an especially important concern in situations where the user cannot recover from the problem by attempting to relearn a different program when the failure case is encountered. This may be because the failure may occur at any point in the future in a different execution environment (or for a different user of the program) where access to the learning system is no longer possible.

In the disclosed PBE systems, the top-program selection is moved from ranking in the synthesis phase to the semantics of the program itself. This may be achieved by maintaining multiple disjuncts in the final program. One challenge with maintaining multiple disjuncts in the final program is the technique for deciding which disjuncts to include, as well as the nature of the selection mechanism that decides between the disjuncts at execution time. In some embodiments, the choices are guided by the goals of correctness as well as performance of the synthesized programs. Described herein are concrete implementations of the disjunctive approach for the text and web application domains, as well as a generic framework in which arbitrary DSLs and synthesis algorithms may be extended to support the learning of disjunctive programs.

The design of a domain specific language (DSL) is an important requirement for any synthesis system. The DSL needs to strike a balance between expressiveness (to handle a range of common tasks in the target domain) and tractability (for the synthesis algorithm to learn correct programs efficiently).

A DSL is defined as a context-free grammar of the form $(\tilde{\psi}_N, \tilde{\psi}_T, \tilde{\psi}_{st}, \tilde{\psi}_{in} R)$, where $\tilde{\psi}_N$ is a set of non-terminal symbols, $\tilde{\psi}_T$ is the set of terminal symbols, $\tilde{\psi}_{st}$ is the start symbol, $\tilde{\psi}_{in}$ the input symbol and R is the set of production rules of the grammar. Each symbol $\psi$ is semantically interpreted as ranging over a set of values $[[\psi]]$, which may be standard programming types such as integers, strings, arrays, lambda expressions, etc. Each production rule $r \in R$ represents an operator in the programming language, and is of the form $\psi_h := Op(\psi_1, \ldots, \omega_n)$, where Op is the name of the operator, which takes parameter types given by the body symbols $\psi_i \in \tilde{\psi}_N \cup \tilde{\psi}_T$ and returns a value of type given by the head symbol $\omega_h \in \tilde{\psi}_N$. Hence the formal semantics of the DSL, is given by an interpretation of each rule r as a function:

$$[[r]]:[[\psi_1]] \times \ldots \times [[\psi_n]] \rightarrow [[\psi_h]]$$

where $\psi_h$ is the head symbol and $\psi_1 \ldots \psi_n$ are the body symbols of the rule operator. A program P of type $\psi$ is any concrete syntax tree defined by the DSL grammar with root symbol ψ. A complete program has the root symbol $ψ_{st}$. Any derivation from a non-root symbol is a sub-program. The input symbol $ψ_{in}$ is a terminal symbol that represents the input to the overall program, and is a global variable that is available to the semantics of all operators in the programming language.

Table 2 shows the DSL $ℒt$ for text manipulation, which is based on the Flash Fill language for string processing using regular expressions. The symbols of the grammar are shown with their associated semantic types with the start and input symbols explicitly marked. The input hip in this case is a string and the output of any complete program res is also a string, e.g., a substring of the input as in the extraction scenario in Table 1. At the top level, the output is a concatenation Concat of constant strings Const or some substrings of the input defined by sub. A substring expression Substr($p_1,p_2$) extracts the substring between two positions $p_1$ and $p_2$ in the input string. Position expressions are defined as either constant positions Pos(k), or Pos($r_1$, $r_2$, k) which determines the kth position in the input string whose left and right sides match regular expressions $r_1$ and $r_2$ respectively. For example, the program for the task in Table 1 that extracts the substring from the first capital letter to the last number is given as Substr(Pos(∈, Caps, 0). Pos(Num, ∈, −1)) (Substr 1) where the negative k indicates occurrence from the end of the string. An alternative program for the same task that extracts until the end of the second number rather than the last number is given as Substr(Pos(∈, Caps, 0), Pos(∈, Num, 1)) (Substr 2).

TABLE 2

@start string res := sub | Const(s) | Concat(res, res)
string sub := Substr(p, `p)
int p := Pos(r, r, k) | Pos(k)
Regex r := ∈ | t | ConcatReg(r, r)
@input string inp    int k    string s    Regex t Table 3 shows the DSL $ℒw$ for extracting nodes from an HTML document. $ℒw$ is based on path expressions and filter predicates similar to CSS selectors. The input inp in this case is the DOM tree of the entire HTML document and the output n of any complete program is a particular node in this tree, e.g., the node containing the flight number in a flight itinerary, as in the extraction task described above.

The top level operator Select(fl, k) selects the kth node from a filtered collection of nodes fl in document order. The Filter(sel, c) operator filters all nodes in a selection sel using a condition c. The sel may be all the nodes in the document (All) or the children of any nodes obtained by another filter operation as given by Children(fl). The condition c used for filtering is a boolean function on nodes defined by a range of atomic predicates (constraints including tag type of the node, its ID, class, regular expression matches in the text content, number of children, style and attributes) as well as any conjunctions Conj(c,c) of these predicates.

For example, a program to extract the 3rd node in a document that has class "c1." and is the child of a "TD" element is given as Select(Filter(Children(Filter(All( ), Tag ("ID"))), Class("c1")), 3).

TABLE 3

@start Node n := Select(fl, k)
Node[ ] fl := Filter(sel, c)
Node[ ] sel := All( ) | Children(fl)

TABLE 3-continued

Func(Node,bool)c := Tag(s) | Class(s) | ID(s) | Text(r)
    | NthChild(k) | NumChild(k)
    | Style(s, s) | Attr(s, s) | Conj(c, c)
@input DomTree inp    string s    int k    Regex r As described below, any DSL may be extended to support disjunctive programs. For example, the DSL designer may choose to provide disjunctive support for any symbols defined in their DSL. Table 4 illustrates a disjunctive extension to a text DSL to support disjunctive programs at the substring operator level. This is indicated by the @disj {f} annotation before the sub symbol. This annotation includes a reference to a new symbol f that has been added to the grammar, which defines a number of feature calculators in the DSL that are used to choose between different substring logics at execution time. The annotation @disj {f} indicates that a disjunctive subprogram for symbol sub is of the form:

$$\text{Disj}([P_1, \ldots, P_n],[F_1, \ldots, F_m],[v_1, \ldots, v_m])$$

where [$P_1$ . . . , $P_n$] is an array of disjuncts of type sub, [$F_1$, . . . $F_m$] is an array of feature programs of type f, and [$v_1$, . . . , $v_m$] is an array of objects of type obj. In an example, the disjunction operator Disj chooses between possible disjuncts $P_1$, . . . , $P_n$ by computing a feature vector on the output of each $P_i$ using the feature functions [$F_1$, . . . $F_m$], and then choosing the output that has a feature vector most similar to the target feature values [$v_1$, . . . , $v_m$].

TABLE 4

@disj{f} string sub := Substr(p, p)
    Func(string, obj) f :=NotNull( ) | NumChars( )
       | NumNonWS( ) | SpecialChars( )

As an example, let us consider the following disjunctive program that addresses the task in Table 1:

$$\text{Disj}([P_1,P_2],[\text{NotNull}(\ ),\text{NumChars}(\ )],[\text{True},9])$$

where $P_1$ and $P_2$ correspond to the two Substr programs, Substr 1 and Substr 2, defined above. $P_1$ extracts up to the last number in the input while $P_2$ extracts up to the second number. In this example, the disjunctive program uses only two feature calculators: NotNull( ) which computes a boolean value indicating if the output substring is non-null, and NumChars( ) which computes the number of characters in the output substring. The target feature values expected for these two features are True and 9, since the output string should be non-null and the product ID strings are of length 9. Hence, when executing this disjunctive program on the inputs in Table 1, both disjuncts $P_1$ and $P_2$ will produce equally scoring outputs on the first three inputs, but on the fourth input $P_2$ produces the higher scoring output for the target feature vector. This is because P2 will output the correct "PID 23342" while P1 will output "PID 23342 Docking station v2". Accordingly, the feature calculator for P1 will not match the NumChars( ) output since the output is not nine characters.

A disjunctive program does need not use all the feature calculators available in the DSL as only some of them may be relevant to the particular situation. The above example program uses two of the calculators, though the DSL could support other features such as NumNonWS( ) and SpecialChars( ) which compute the number of non-whitespace characters and the set of special characters occurring in the output. The DSL may include various feature calculators, and the synthesis algorithm may then select which features and the target value vector to include in the disjunctive program based on the provided example(s).

Table 5 shows example of a disjunctive DSL that includes extensions made to a web DSL. As discussed above, finding a node within a DOM involves an uncertainty in what logic to use to filter nodes down to the target extraction. Due to this, support for disjunctive programs for the fl symbol is chosen in order to consider alternative filtering logics in the final program. In this example, a single feature calculator NonEmpty( ) that checks if the filtered set contains at least one node is used.

TABLE 5

@disj{f} Node[ ] fl := Filter(sel, c)
Func(string, obj) f :=NonEmpty( )

As an example, the following disjunctive program addresses the flight number extraction task described above:

$$Disj([P_1,P_2,P_3],[NonEmpty( )],[True])$$

where
$P_1$=Filter(All( ), Conj(Style("color", "gray"), Class ("c1")))
$P_2$=Filter(All( ), Class("c1"))
$P_3$=Filter(All( ) Style("color", "gray"))

In this example, the most restrictive conditions may be tried first, and if the program fails to find any nodes then less restrictive conditions may be tried. This example also illustrates that the Disj( ) operator may use the ordering on the disjuncts to select the first disjunct if there are ties in the feature scores for different disjuncts.

Although the above sample DSLs for both the text and web domains have disjunctive support for only one symbol in each DSL, a DSL may include any number of disjunctive symbols. One example of a DSL including disjunctive support for two different symbols is the language DSL $\mathcal{L}tw$, which combines both grammars DSL $\mathcal{L}t$ and DSL $\mathcal{L}w$ along with a top-level operator that first extracts the node from an HTML document and then performs a substring extraction on the text content of this node.

The formal semantics of the Disj( ) operator and the formulation of disjunctive DSLs in an abstract framework is described below. A disjunctive DSL is of the form $(\tilde{\psi}_N, \tilde{\psi}_T, \tilde{\psi}_{st}, \tilde{\psi}_{in}, R, \Delta)$, which extends the definition of a standard DSL given above with the one additional parameter $\Delta$. The parameter $\Delta$: $\tilde{\psi}_N \rightarrow \tilde{\psi}_f$ maps certain symbols that support disjunctives to the symbols that represent their feature calculators. The well-formedness constraint on this map is that if $\Delta[\psi]=\omega_f$ then the type of $\psi_f$ is Func($\psi$, obj). For example, the text DSL has $\Delta$[sub]=f mapping the single substring symbol to its feature calculator symbol in the grammar.

Given tp that supports disjunctive with $\Delta[\psi]=\psi_f$, let T=[[$\psi$]] be the semantic type of $\psi$. The semantics of the disjunction operator for $\psi$ is defined in Table 6 below. The operator takes as parameters the outputs produced by a list of disjuncts (disjuncts), the list of feature calculators to compute relevant features on these outputs (features), and the target vector v of values for each of the features (which, in an example, is expected to be of the same length as the features array).

TABLE 6

Disj (T[ ] disjuncts, Func(T, obj)[ ] features, obj[ ] v) {
 for each d in disjuncts TABLE 6-continued let s = {i | features [i](d) == v[i]}
let score [d] = s
return the first d in disjuncts where score[d] = Max(score)
}

The operator computes the given features on each of the disjunct outputs and returns the output on which the most feature values match the target values in v. In an example, this is the scoring function used to select the disjunct. In other examples, however, a different scoring function may be used to select between different disjuncts that may incorporate weights associated with different features or use more sophisticated similarity measures than simple equality of feature values. For example, one feature may be more heavily weighted compared to other features.

In addition, in some examples, only minimal thresholds of feature values may need to be satisfied to accept a disjunct, in which case not all disjunct outputs need to be computed. Rather, a more performant lazy evaluation in which the first disjunct that satisfies the given thresholds may be selected.

Using disjuncts may be incorporated into a PBE system. Accordingly, a synthesis algorithm may learn/synthesize disjunctive programs from input-output examples. The algorithm described is agnostic of any particular DSL, as the algorithm takes the DSL and some other domain-specific properties as configuration parameters for particular domain instantiations. An example algorithm is shown below in Table 7.

In an example, the algorithm is based on learning program expressions in the DSL by propagating example-based constraints on any expression to its subexpressions. The constraint propagation may be done using domain-specific properties of DSL operators, which may be provided in the configuration parameter.

TABLE 7

```
1:  function SynthProg(C, φ, ψ)
2:    let C.DSL = (ψ̃_N, ψ̃_T, ψ̃_st, ψ̃_in, R, Δ)
3:    Progs ← ∅
4:    if C.Synth[ψ] is defined for ψ then
5:      Progs ← C.Synth[ψ](φ)
6:    else
7:      for each r ∈ R where r has head ψ do
8:        let r be ψ := Op(ψ_i, ..., ψ_n)
9:        S ← {[ ]}
10:       for i = 1 ... n do
11:         S' ← ∅
12:         for each [P_1, ... P_{i-1}] ∈ S do
13:           φ_i ← C.InferSpec[r ](φ, ψ_i,[P_1, ..., P_{i-1}])
14:           P̃ ← SynthProg(C.DSL, φ_i, ψ_i)
15:           S' ← S' ∪ {[P_1, ... , P_{i-1},P] | P ∈ P̃}
16:         S ← S'
17:       Progs ← {Op(P1 , ..., Pn) | [P1 , ..., Pn] ∈ S}
18:     topProgs    C.Ranker(Progs )
19:     if Δ[ ψ] not defined then
20:       return topProgs
21:     else
22:       ψ_f ← Δ[ψ]
23:       F ← [ ]
24:       V ← [ ]
25:       for each r ∈ R where r has head ψ_f do
26:         let r be ψ_f := Op(ψ)
27:         if exists v such that[[Op]](P(I)) = v for all
28:           P ∈ topProgs and all inputs I in φ then
29:           f ←[[r]]( )
30:           F ← F · f
31:           V ← V · v
32:     return {Disj(topProgs, F, V)}
```

The configuration parameter C to the algorithm contains four domain-specific components used by the algorithm: DSL, InferSpec, Synth and Ranker. The DSL is the domain-specific language in which programs will be synthesized. InferSpec is a map from operator rules in the DSL to a specification inference function for the rule. Specification inference functions may be based on witness functions.

The specification inference function for an operator rule in the DSL is a function that computes specifications on the parameters of the operator given a specification on the operator itself. For a rule r in the DSL of the form $\psi := Op(\psi_i, \ldots, \psi_n)$ and an output specification $\phi$ on the output of this operator. InferSpec[r] is a function of the form $F(\phi, \psi_i, [P_1, \ldots, P_{i-1}])$ that returns a specification $\phi_i$ for the ith parameter of the operator given the program expressions already computed for the first i−1 parameters.

For example, for the Concat(res, res) operator in the text DSL, assume there is a specification where the output should be s2 on an input s1. Then a specification inferred for the first parameter is that it should produce any prefix of s2. If such a program P producing a prefix s' is learned, then a specification for the second parameter with respect to P: that the second parameter should produce any suffix s" such that s2=s'±s" may be inferred.

As another example of specification propagation, a specification $\phi$ for the substring operator Substr(p,p) produces output "bc" on input "abed". In this case, the specification $\phi_1$ inferred for the first parameter is that it should produce position 1 on the given input, while the specification $\phi_2$ inferred for the second parameter is that it should produce position 3 on that input. As an example in the web DSL, a specification for the Select(fl, k) operator should output a node n. The specification inferred for the first parameter fl is that this should be any collection that contains n, while the specification for k depends on the first parameter and requires that k be the index of n in that collection.

Although specification inference functions may be provided for most operators in a DSL, for some DSL symbols, especially terminal symbols, domain-specific learning strategies may be used to infer the programs directly. This is the base case where specifications are no longer propagated downwards. For example, for an atomic regular expression token t in the text DSL, a specification may be propagated down from the position operator that the regex must have a match on input s that ends at position i in s. In this base case, this specification will not be propagated down further, but will simply check the possible atomic regexes in the DSL that satisfies this constraint and return those regexes. Such domain-specific learning strategies are provided in the Synth component of the configuration parameter C, which is a map from certain DSL symbols to functions for directly learning programs for that symbol from the given specification. For such a symbol $\psi$, Synth[$\psi$] is a function of the form $F(\phi)$ which returns a set of programs of type $\psi$ that satisfy $\phi$.

The final component of the configuration parameter C is the ranking function Ranker, which takes a set of programs and returns a list of top programs ordered according to some ranking criteria. For example, for the text DSL, Ranker may prefer "simpler" programs. In the web case, Ranker may be based on preferring the most specific programs for selecting nodes.

The synthesis algorithm is shown above in Table 7. The SynthProg(C, $\phi$, $\psi$) returns a set of top-ranked programs of type $\psi$ in the provided DSL that satisfy the given specification $\phi$. To construct complete programs in the DSL, $\psi$ is chosen to be the start symbol $\psi_{st}$.

In a first phase, the algorithm computes the set of programs Progs that satisfy the specification (lines 3 to 17). If a specific synthesis function is already provided for this symbol in C then that synthesis function is used (line 5). Otherwise, synthesis is performed using the specification propagation approach. For each operator rule in the DSL with head $\psi$, possible programs are computed that use this operator at the top-level (lines 8 to 17). This may be done by building the lists of parameter instantiations of the operator (stored in the variable S) until instantiations for all parameters of the operator are determined.

For each parameter, a specification for that parameter is inferred using the instantiations of the previous parameters already computed (line 13). This specification is then used to synthesize programs for this parameter with a recursive call to the synthesis algorithm (line 14). These programs are used to grow the parameter instantiation list S (line 15). At line 17, all the possible programs are added using to the set Progs. In practice, various optimizations may be made over this general description. Optimizations may include caching the results of particular synthesis calls for a given specification which may often be repeated, clustering programs together that produce the same outputs, and setting recursion limits to bound the size of programs considered.

The next phase in the algorithm is to choose the top-ranked programs and to construct a disjunctive program as needed (lines 18 to 32). The top-ranked program is obtained from the set Progs using the ranking function. If the symbol $\psi$ is not a disjunctive symbol in the DSL then the top-ranked set is returned (line 20). Otherwise, a disjunctive program is synthesized for the symbol $\psi$.

To synthesize the disjunctive program, the feature calculator symbol $\psi_f$ is obtained. The feature calculator vector and the target feature values vector V are initialized (lines 22 to 24). The synthesizer then selects the features that will be included in the disjunctive program and to choose between different disjuncts. In an example, these features are selected as all the ones that yield the same value across all the training examples provided to the algorithm. A reason for this is to synthesize a disjunctive program that will prefer disjuncts whose result are most similar to the training examples.

For example, the text DSL includes the NotNull and NumChars features which indicate whether the output is null and the size of the output string respectively. Hence a program to address the text extraction task in Table 1 would use features: NotNull=True and NumChars=9. This is because those feature values are consistent across any example outputs in Table 1 that may be given to the synthesizer. Similarly, in the web case, the failure to return any result (or an empty result) is just a feature of the output that is handled in the same way: if all the example outputs given for a task are non-empty, then the synthesizer will include the NonEmpty feature in the disjunctive program with target value of True. Hence for each feature calculator rule in the DSL with head $\psi_f$, the synthesizer checks if the top programs yield the same value for this feature in all the given example inputs (line 27). If such a consistent value v exists, then v is added to the target value vector V and the feature calculator function is added to the vector F. Finally, a single disjunctive program with the Disj operator using the vectors F and V, and the top-ranked programs as the disjuncts is returned.

The algorithm described above chooses the disjuncts in the final program using the top-ranked programs. In an example, the number of disjuncts may be 3, 5, 10, 20, etc. In the case of the text DSL where disjunctive synthesis was performed on the substring operator, the ranking used by the underlying Flash Fill system produced effective disjuncts. However, in the case of web extraction the existing synthesis systems did not provide adequate disjuncts for the filter operators, as these systems tend to favor the most specific condition possible or other heuristic techniques to choose the filtering condition, which did not work well in practice.

With the disjunctive approach, general conditions as possible disjuncts were considered to guard against overfitting. All possibilities, however, are unlikely to be used because, there may be an exponential number of possible conjunctive conditions c for the filter operator in the web DSL. Instead, in an example, a learning strategy for disjuncts that considers the maximal (the most specific) as well as a set of minimal (least restrictive) conjunctions that satisfy the specification may be used. This disjunct learning is implemented in the Synth[c]($\phi$) function which synthesizes conditions for the filter operator.

The specification $\phi$ given to this function specifies that the computed condition expression P must hold for a subset N' of the input node set N. In an example, the learning function first computes all the atomic predicates A1, . . . , An of symbol c that satisfy the specification. The top-ranked disjunct considered is the most specific condition P1=A1 $\wedge$ . . . $\wedge$ An. The remaining disjuncts may then be computed as the smallest conjunctions that produce the same filtered set of nodes as P1 on the input set. This makes the disjuncts semantically equivalent programs over the given input. As this computation of minimals is equivalent to the minimal set cover problem which is NP-complete, a greedy approximation algorithm may be used to compute the minimals efficiently. Every atomic predicate Ai is ensured to be included in some minimal, in order to produce an effective set of disjuncts that cover all predicates in the disjunctive program.

To test the described DSLs and disjunctive program synthesis for both the text and web extraction domains Microsoft@ PROSE® framework was used for program synthesis. To text synthesis email extraction tasks were considered. Users often get emails regularly from the same provider such as flight itineraries, hotel bookings or purchase receipts, and user would like a PBE feature that allows users to create work flows for extracting important content from email. For example, useful information may be extracted when an email arrives. In an example, users may give examples to the PBE system by highlighting important fields in existing emails. However, in this scenario the web extraction DSL alone does not suffice, as many of the provided benchmarks include substring extractions from nodes in the HTML. The DSL $\mathcal{L}tw$ which incorporates both the web and text DSLs may be used, so the extraction program first selects a node and then performs a substring extraction on its text content.

To test performance, forty-seven extraction tasks from eight different providers were used. Thirty-four tasks required substring extractions on the node content rather than just node selections. For each extraction task, there were one, two, three, five, ten, etc. test instances of an input and the desired output. In each instance, the input was an email and the output was a text string of the field to be extracted, e.g., the flight number from a flight confirmation email, etc.

An important consideration for a synthesized program is for the system to learn robust programs that do not easily fail on new inputs. To measure robustness the minimum number of examples required to learn a correct a program for a given task was used. More precisely, the minimum number of examples is the minimum number of input-output instances that were required as examples to be given to the system such that the program it synthesized succeeded on all the remaining instances.

The disjunctive learning system was compared against a baseline system that did not include any disjunctive operators in the same DSL. FIG. 1 shows the comparison of the minimum number of examples required by the disjunctive approach 110 and the baseline 120. In summary, the proportion of tasks for which a correct program was synthesized from one example increased from 59.6% to 93.6% with the disjunctive approach.

These results show the minimum number of examples required to learn a correct program, rather than the number of examples a user may provide in practice, which could be many more. This is because a user does not know which examples will be useful for the system (e.g., representative samples covering all "corner cases") and while they may make the effort to give many more examples, they may only encounter the relevant or useful examples when the system fails to work on some future email. This uncertainty of not knowing which examples to give makes the difference between requiring one or more examples important for the user experience and product quality.

In terms of performance, there was an average of 2.9× slowdown in the disjunctive case, which is expected since disjunctive programs perform more computations as they consider multiple alternative branches. However, most test instances in the disjunctive case completed in under half a second and all completed in under two seconds.

Figure 2:
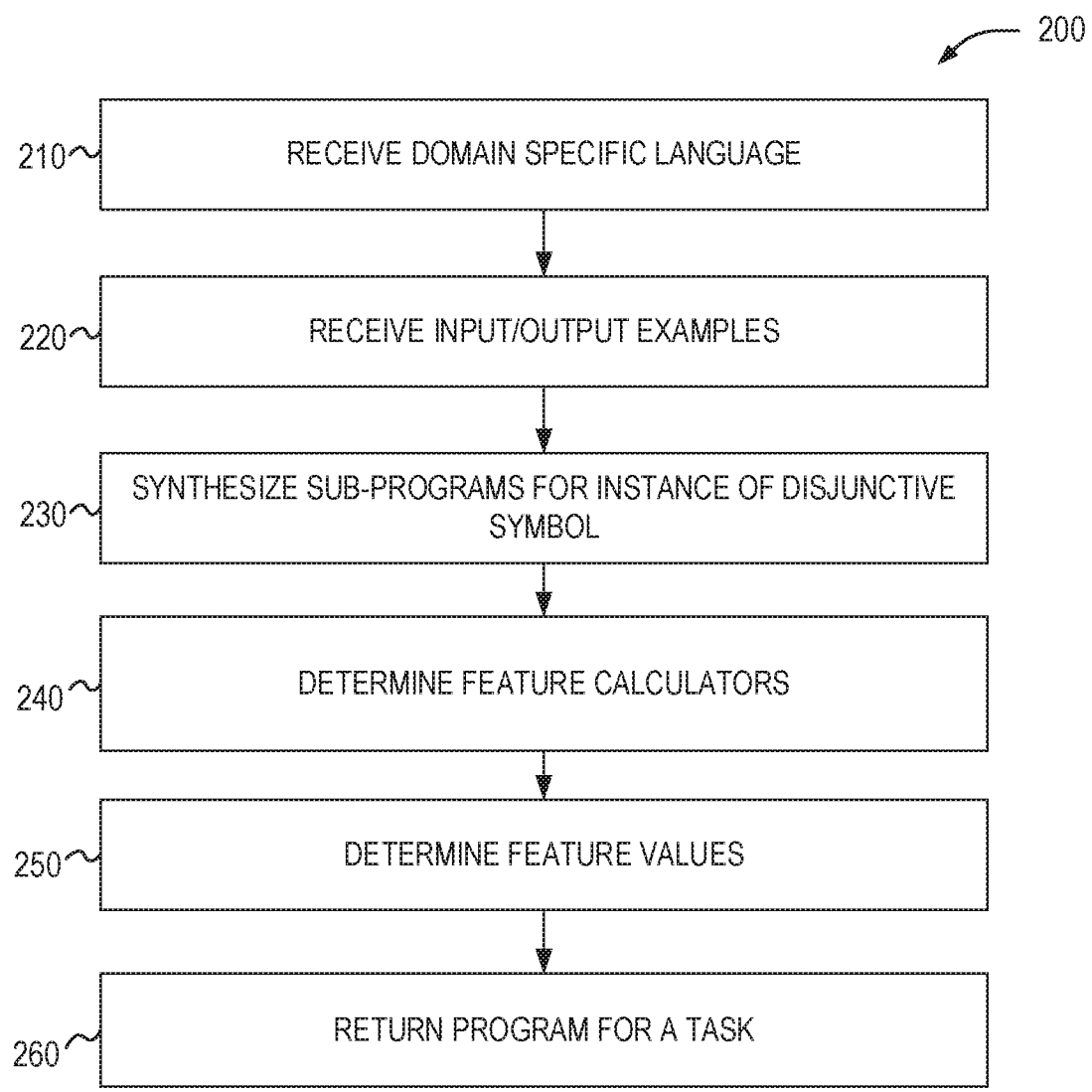
FIG. 2 is a flow diagram of a process for synthesizing a disjunctive program in accordance with respective examples.

FIG. 2 is a flow diagram of a process for synthesizing a disjunctive program in accordance with respective examples. In an example, the disjunctive program attempts to determine an intent of the user from a limited number of input/output examples. The number of input/output examples may be a single input/output example. The disjunctive program may then be used on different input to generate output in a form intended by the user. Examples of synthesized programs include extracting data from an email, formatting data, etc.

At 210, a domain specific language is received. The domain specific language includes at least one symbol that is specified as a disjunctive symbol. The disjunctive symbol indicates that instances of this symbol in a program and/or sub-program may contain more than one logics that are selected at runtime. At 220, an input/output example is received. More than one input/output example may be received. In one example, a single input/output example is received. The input may be an email, a web page, text, etc. The output may be text.

Using the domain specific language and the input/output example, a program is synthesized. The synthesis includes handling instances of disjunctive symbols. At 230, as part of synthesizing the program, two or more sub-programs for an instance of a disjunctive symbol are synthesized. The sub-program may be part of the final program. In addition, the entire program may be a disjunctive program. At 240, for an instance of a disjunctive symbol, a feature calculator is determined. In an example, there are multiple possible feature calculators. One way to determine the feature calculators for a specific disjunctive instance is to include all of the feature calculators. When there are multiple input/output examples, the set of feature calculators may include the feature calculators that have a consistent result across all input/output examples. At 250, a set of feature values are determined. The feature values represent the features of a valid output. In an example, the output of the selected feature calculators is used as the set of feature values. At 260, once the synthesis is completed the program is returned. The returned program includes the sub-programs from 230, the set of feature calculators from 240, and the set of feature values from 250.

After the program is returned, the program may be executed on new input that is not part of the provided input/output examples from 220. Accordingly, the new input cannot have been used during synthesis of the program. Unlike traditional PBE systems, the program from 260 uses the different sub-programs from 230 to be more flexible in how new input is handled. Accordingly, the program is able to be more robust in that different sub-programs may be run on different data to produce more accurate output. In addition, the feature calculators and feature values help ensure that the output has features consistent or close to the feature values.

Once the new input is received, the program is executed. Execution of the program is different from traditional PBE generated programs since a specific sub-program for each disjunction symbol instance is selected. When a disjunctive instance is executed, each of the sub-programs may be executed on the new input. The output from each of the sub-programs may then be passed to each of the feature calculators associated with that instance. The output from the feature calculators may then be compared with the feature values. In an example, the sub-program that created the output whose feature calculator values are closest to the feature values from 250 is selected.

Figure 3:
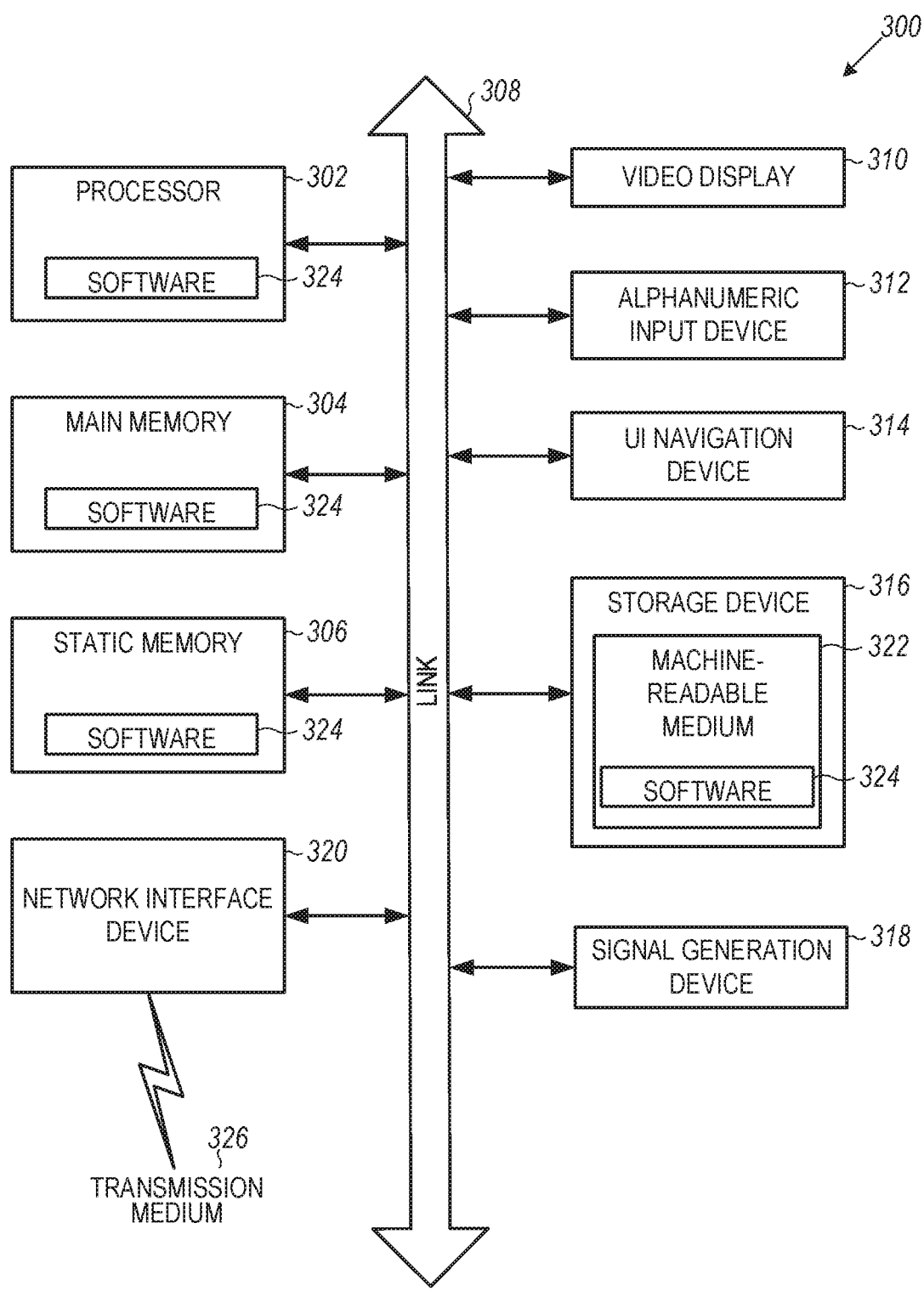
FIG. 3 is an example computing device that can be used in conjunction with the technologies described herein.

FIG. 3 is an example computing device that can be used in conjunction with the technologies described herein. In alternative embodiments, the computing device 300 may operate as a standalone device or may be connected (e.g., networked) to other computing devices. In a networked deployment, the computing device 300 may operate in the capacity of a server communication device, a client communication device, or both in server-client network environments. In an example, the computing device 300 may act as a peer computing device in peer-to-peer (P2P) (or other distributed) network environment. The computing device 300 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may be an implementation of device 110, 120, 130, and may implement the profile store 140, and perform the method of FIG. 2.

Computing device 300 may include a hardware processor 302 (e.g., a central processing unit (CPU), a graphics processing unit (GPU), a hardware processor core, or any combination thereof), a main memory 304 and a static memory 306, some or all of which may communicate with each other via a link (e.g., bus) 308. The computing device 300 may further include a display unit 310, an input device 312 (e.g., a keyboard), and a user interface (UI) navigation device 314 (e.g., a mouse). In an example, the display unit 310, input device 312, and UI navigation device 314 may be a touch screen display. In an example, the input device 312 may include a touchscreen, a microphone, a camera (e.g., a panoramic or high-resolution camera), physical keyboard, trackball, or other input devices.

The computing device 300 may additionally include a storage device (e.g., drive unit) 316, a signal generation device 318 (e.g., a speaker, a projection device, or any other type of information output device), a network interface device 320, and one or more sensors 321, such as a global positioning system (GPS) sensor, compass, accelerometer, motion detector, or other sensor. The computing device 300 may include an input/output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc. via one or more input/output ports.

The storage device 316 may include a computing-readable (or machine-readable) storage media 322, on which is stored one or more sets of data structures or instructions 324 (e.g., software) embodying or utilized by any one or more of the techniques or functions described herein. In an example, at least a portion of the software may include an operating system and/or one or more applications (or apps) implementing one or more of the functionalities described herein. The instructions 324 may also reside, completely or at least partially, within the main memory 304, within the static memory 306, and/or within the hardware processor 302 during execution thereof by the computing device 300. In an example, one or any combination of the hardware processor 302, the main memory 304, the static memory 306, or the storage device 316 may constitute computing device (or machine) readable media.

While the computer-readable storage media 322 is illustrated as a single medium, a "computer-readable storage media" or "machine-readable storage media" may include a single medium or multiple media (e.g., a centralized or distributed database, and/or associated caches and servers) configured to store the one or more instructions 324.

In an example, a computer-readable storage media or machine-readable storage media may include any medium that is capable of storing, encoding, or carrying instructions for execution by the computing device 300 and that cause the computing device 300 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 324 may further be transmitted or received over a communications network 326 using a transmission medium via the network interface device 320 utilizing any one of a number of transfer protocols (e.g., frame relay, internee protocol (IP), transmission control protocol (TCP), user datagrarn protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 320 may use the transfer protocols to transmit data using transitory propagating signals.

In an example, the network interface device 320 may include one or more physical jacks (e.g., Ethernet, coaxial, or phone jacks) or one or more antennas to connect to the communications network 326. In an example, the network interface device 320 may include one or more wireless modems, such as a Bluetooth modem, a Wi-Fi modem or one or more modems or transceivers operating under any of the communication standards mentioned herein. In an example, the network interface device 320 may include a plurality of antennas to wirelessly communicate using at least one of single-input multiple-output (SIMO), multiple-input multiple-output (MIMO), or multiple-input single-output (MISO) techniques. In some examples, the network interface device 320 may wirelessly communicate using Multiple User MIMO techniques. In an example, a transmission medium may include any intangible medium that is capable of storing, encoding or carrying instructions for execution by the computing device 300, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for synthesizing a program for a task, the method comprising operations performed using an electronic processor, the operations comprising:
   receiving a domain specific language comprising a disjunctive symbol;
   receiving a first input/output example for the task;
   synthesizing a program for the task for execution on the electronic processor based on the first input/output example and the domain specific language, wherein the synthesizing comprises:
   synthesizing a plurality of sub-programs for an instance of the disjunctive symbol based on the domain specific language;
   determining a set of feature calculators based on the plurality of sub-programs and the first input/output example for the instance of the disjunctive symbol;
   determining a set of target feature values based on the plurality of sub-programs and the first input/output example for the instance of the disjunctive symbol;
   returning the program for the task comprising the plurality of sub-programs, the set of feature calculators, and the set of target feature values;
   receiving a second input/output example different from the first input/output example; and
   selecting output from a sub-program whose output satisfies a threshold based on an ordering for execution of the sub-programs.

2. The method of claim 1, wherein the determining a set of feature calculators comprises determining a feature calculator that has a consistent result across all of the plurality of sub-programs and the input/output example.

3. The method of claim 2, wherein the determining a set of target feature values comprises adding the consistent result to the set of target feature values.

4. The method of claim 1, wherein the set of feature calculators comprises one of a not null feature calculator, a number of characters feature calculator, a number of non-white-space characters feature calculator, and a number of special characters feature calculator.

5. A system for synthesizing a program for a task comprising:
   one or more electronic processors, the one or more electronic processors configured to:
   receive a domain specific language comprising a disjunctive symbol;
   receive a first input/output example for the task;
   synthesize a program for the task based on the first input/output example and the domain specific language, wherein the synthesizing comprises:
   synthesize a plurality of sub-programs for an instance of the disjunctive symbol based on the domain specific language;
   determine a set of feature calculators based on the plurality of sub-programs and the first input/output example for the instance of the disjunctive symbol;
   determine a set of target feature values based on the plurality of sub-programs and the first input/output example for the instance of the disjunctive symbol;
   return the program for the task comprising the plurality of sub-programs, the set of feature calculators, and the set of target feature value;
   receive a second input/output example different from the first input/output example; and
   for each of the sub-programs performing operations based on an ordering for execution of the sub-programs upon execution on the second input/output example, the operations comprising:
   generating a disjunct output;
   generating feature outputs;
   comparing the feature outputs to the set of target feature values; and
   selecting the disjunct output from the plurality of sub-programs based on the comparison of the feature outputs to the set of target feature values.

6. The system of claim 5, wherein to determine a set of feature calculators the one or more processors are configured to determine a feature calculator that has a consistent result across all of the plurality of sub-programs and the input/output example.

7. The system of claim 6, wherein to determine a set of target feature values the one or more processors are further configured to add the consistent result to the set of target feature values.

8. The system of claim 5, wherein the set of feature calculators comprises one of a not null feature calculator, a number of characters feature calculator, a number of non-white-space characters feature calculator, and a number of special characters feature calculator.

9. A computer-readable storage media storing computer-executable instructions for synthesizing a task for a program, the stored instructions comprising:
- instructions to receive a domain specific language comprising a disjunctive symbol;
- instructions to receive a first input/output example for the task;
- instructions to synthesize a program for the task based on the first input/output example and the domain specific language, wherein the synthesizing comprises:
- instructions to synthesize a plurality of sub-programs for an instance of the disjunctive symbol based on the domain specific language;
- instructions to determine a set of feature calculators based on the plurality of sub-programs and the first input/output example for the instance of the disjunctive symbol;
- instructions to determine a set of target feature values based on the plurality of sub-programs and the first input/output example for the instance of the disjunctive symbol;
- instructions to return the program for the task comprising the plurality of sub-programs, the set of feature calculators, and the set of target feature values;
- instructions to receive a second input/output example different from the first input/output example;
- for each of the sub-programs:
- instructions to execute the sub-program based on an ordering for execution of the sub-programs on the second input/output example to generate a disjunct output;
- instructions to execute the set of feature calculators on the disjunct output to generate feature outputs; and
- instructions to compare the feature outputs to the set of target feature values; and
- instructions to select the disjunct output from the plurality of sub-programs based on the comparison of the feature outputs to the set of target feature values.

10. The computer-readable storage media of claim 9, wherein the instructions to determine a set of feature calculators the instructions further comprise instructions to determine a feature calculator that has a consistent result across all of the plurality of sub-programs and the input/output exam pie.

* * * * *